United States Patent [19]
Schumann et al.

[11] Patent Number: 5,295,908
[45] Date of Patent: Mar. 22, 1994

[54] SPACING MECHANISM FOR THE PLATES OF A FLUID FRICTION COUPLING

[75] Inventors: Siegfried Schumann; Wolfgang Gimpel, both of Lohmar, Fed. Rep. of Germany

[73] Assignee: Viscodrive GmbH, Lohmar, Fed. Rep. of Germany

[21] Appl. No.: 71,373

[22] Filed: Jun. 2, 1993

Related U.S. Application Data

[63] Continuation of Ser. No. 866,083, Apr. 3, 1992, abandoned, which is a continuation of Ser. No. 561,970, Aug. 2, 1990, abandoned.

[30] Foreign Application Priority Data

Aug. 22, 1989 [DE] Fed. Rep. of Germany ....... 3927586
Sep. 1, 1989 [DE] Fed. Rep. of Germany ....... 3928976

[51] Int. Cl.$^5$ ............................................. F16D 7/02
[52] U.S. Cl. ...................................... 464/45; 192/588
[58] Field of Search .................... 464/24, 45, 46, 47; 192/588, 57, 70.28; 475/85, 87, 89

[56] References Cited

U.S. PATENT DOCUMENTS

| | | | |
|---|---|---|---|
| 2,174,240 | 9/1939 | Glenney | 192/70.28 X |
| 3,081,854 | 3/1963 | Snyder | 192/70.28 X |
| 3,760,922 | 9/1973 | Rolt et al. | 192/70.28 X |
| 4,058,027 | 11/1977 | Webb | 475/85 |
| 4,676,356 | 6/1987 | Beccaris et al. | 192/70.28 |
| 4,885,957 | 12/1989 | Taureg et al. | 475/89 |

FOREIGN PATENT DOCUMENTS

| | | |
|---|---|---|
| 712476 | 7/1954 | United Kingdom . |
| 2207983 | 2/1989 | United Kingdom . |
| 2222232 | 2/1990 | United Kingdom . |

Primary Examiner—Daniel P. Stodola
Assistant Examiner—Eileen Dunn
Attorney, Agent, or Firm—Harness, Dickey & Pierce

[57] ABSTRACT

A fluid friction coupling comprises a coupling hub (1) and a coupling housing (2) rotatably supported on the coupling hub. The coupling also comprises sets of plates (6; 7) non-rotatably mounted on the hub and housing. One set of plates has spacing teeth (8) which, while eliminating the previously used spacer rings, permit accurate spacing of the set of plates. A predetermined number of spacing teeth (8) of the axially immovable plates (7) are bent out of the plane of the respective plate so as to be Z-shaped with both bending angles approximately 90 degrees. This measure ensures that the plates for a friction coupling are designed in such a way that they are accurately spaced at predetermined distances and that they are suitable for automatic assembly purposes.

3 Claims, 5 Drawing Sheets

SPACING MECHANISM FOR THE PLATES OF A FLUID FRICTION COUPLING

This is a continuation of U.S. patent application Ser. No. 866,083, filed Apr. 3, 1992, which is a continuation of Ser. No. 561,970, filed Aug. 2, 1990, both now abandoned.

BACKGROUND OF THE INVENTION

1. Field of the Invention

This invention relates to a fluid friction coupling comprising at least one coupling hub, a coupling housing rotatably supported on the coupling hub, and two sets of plates, one non-rotatably connected to the coupling hub and one non-rotatably connected to the coupling housing, the plates of the sets of plates being disposed in an alternating sequence with the plates of a first of the sets being held at predetermined spacings from one another while the plates of the other set are axially movable.

2. Description of Prior Art

With such fluid friction couplings such as they are known from West German Patent Specification No. 38 28 421 C1 and its British equivalent No. 2 222 232, spacing between the first set of plates is achieved by so-called spacer rings of a predetermined thickness. These spacer rings are slotted and as compared to the inner diameter of the coupling housing, they have a slightly increased outer diameter so that they rest against the inner housing wall in a prestressed condition. However, a disadvantage of this design is that automatic assembly of the plates is either not possible at all or causes great difficulties, which is the reason why the plates are still fitted by hand.

From U.S. Pat. No. 4,058,027, it is known to arrange a certain number of teeth on the plates in an angular position in order to achieve a spring-loaded return. However, for spacing the plates such an angular position is not suitable because the tolerances of the outer diameter and especially centering of the plates have to be very close to achieve uniform dimensions for the distances to be observed, whereas an articulated position, because of its spring-loaded return forces, does not permit such tolerances or only with considerable effort.

From West German Patent Specification No. 37 26 641 C1 and its British equivalent No. 2 207 983 it is known to provide one of the sets of plates with cam-like pressed-out regions which are aligned relative to each other in one direction of rotation and which increase the distance between the associated plates. However, it is the purpose of this design to provide the fluid friction coupling with different torque characteristics for the two directions of rotation; a predetermined distance between the plates cannot be achieved with such pressed-out regions.

SUMMARY OF THE INVENTION

It is the object of the present invention to provide a fluid friction coupling of the initially described type which, while eliminating the previously used spacer rings, permits accurate spacing of the plates.

The invention provides a fluid friction coupling comprising at least one coupling hub, a coupling housing rotatably supported on the coupling hub, and two sets of plates, one non-rotatably connected to the coupling hub and one non-rotatably connected to the coupling housing, the plates of the sets of plates being disposed in an alternating sequence with the plates of a first of the sets being held at predetermined spacings from one another while the plates of the other set are axially movable, wherein the plates of the first set have a predetermined number of spacing teeth each of which is bent out of the plane of the plate to form a Z-shape having two bending angles which are both approximately 90 degrees.

Each spacing tooth, thus, has a first portion which extends substantially normally of the plane of the plate and a second portion which extends from the end of the first portion substantially parallel to the plane of the plate.

In this way, it is possible for the plates of the fluid friction coupling to be spaced accurately at predetermined distances. Such plates are suitable for automatic assembly, and the invention permits the inner or outer plates to be provided with bent teeth. As bending angles of approx 90 degrees are used for the Z-shape, the dimensional accuracy of the axial bends is determined exclusively by the accuracy of the tool used. Other tolerances such as those of the outer diameter, inner diameter or material thickness do not affect the dimensional accuracy of the bends. A further advantage of the bends in accordance with the invention consists in the fact that the bent teeth are not subject to bending moments. Any axial forces acting on the bent regions can only affect the axial webs in the form of compressive forces.

In a preferred embodiment in the case of which assembly is particularly easy, the first set of plates having the spacing teeth is a set of outer plates non-rotatably connected t the coupling housing. However, the first set may be a set of inner plates non-rotatably connected t the coupling hub.

A fluid friction coupling may be designed as a torque splitter which comprises two sets of inner plates, with a predetermined number of teeth of both sets of inner plates non-rotatingly connected to separate coupling hubs and either the outer plates or both sets of inner plates having spacing teeth.

BRIEF DESCRIPTION OF THE DRAWINGS

Illustrative embodiments of the invention are described in detail below with reference to the attached drawings.

In the drawings.

DESCRIPTION OF PREFERRED EMBODIMENTS

Figure 1:
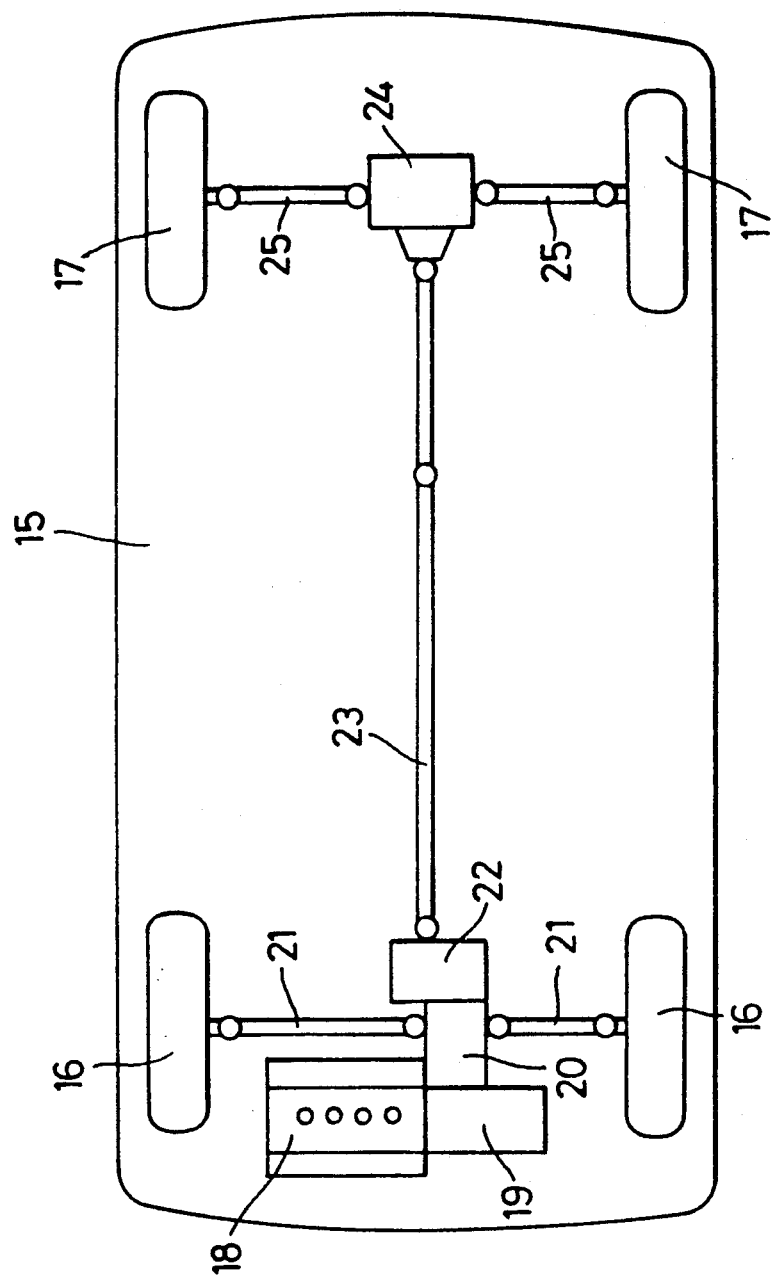
FIG. 1 is a diagram illustrating the drive concept of a four wheel drive vehicle with a fluid friction coupling incorporated into the driveline.
Figure 2:
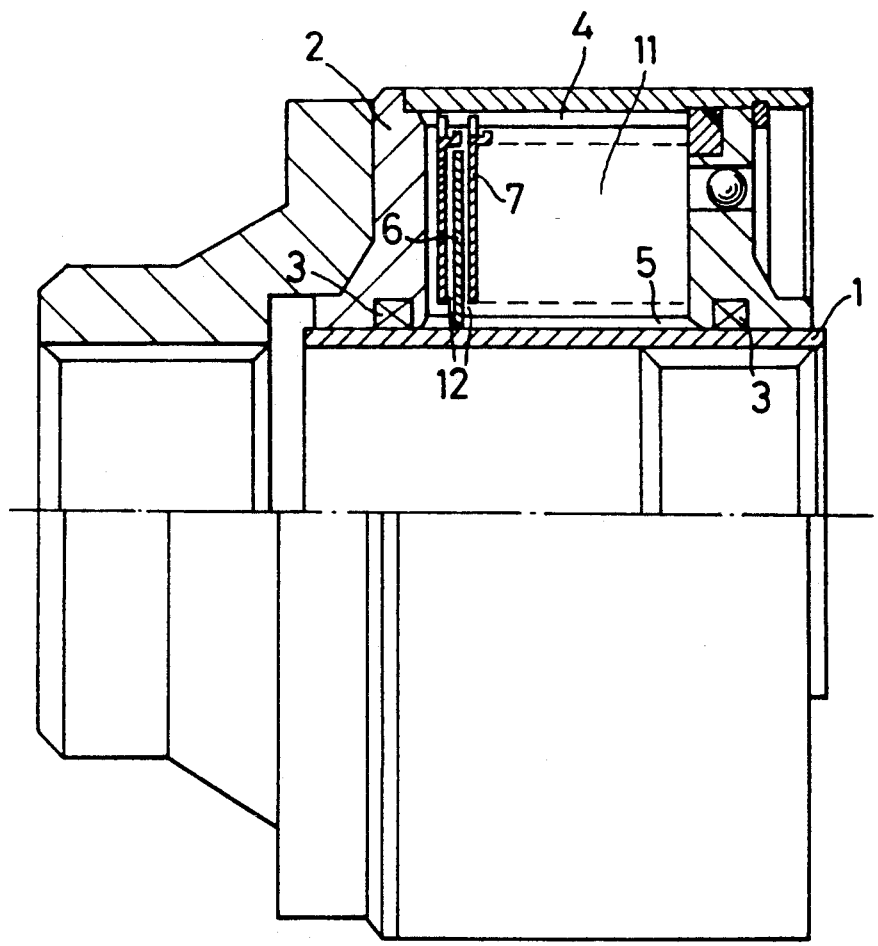
FIG. 2 is a longitudinal section through a fluid friction coupling in accordance with the invention.

FIG. 1 shows the drive concept of a four wheel drive vehicle 15 the basic concept of which is that of a front wheel drive vehicle. The two front wheels 16 are driven by the engine 18 via a gearbox 19 and a front axle differential 20 as well as via the front sideshafts 21. The drive for the rear wheels 17 is branched off the drive of the front axle differential 20. For this purpose, the front axle differential is associated with a central differential 22 which is equipped with a fluid friction coupling as illustrated in FIG. 2 in order to achieve a speed-dependent locking effect of the central differential. Via a propeller shaft 23, the central differential 22 is connected to the rear axle differential 24 which drives the rear wheels 17 via rear sideshafts 25.

The fluid friction coupling illustrated in FIG. 2 essentially comprises a coupling hub 1 and a coupling housing 2 rotatably supported on the hub 1 and sealed by seals 3. The inner wall of the coupling housing 2 is provided with inner teeth 4, whereas the coupling hub 1 comprises outer teeth 5. In the outer teeth 5 there are arranged correspondingly toothed plates 6 of a set of inner plates so as to be non-rotatable, but axially movable on the coupling hub 1. Plates 7 of a set of outer plates provided with teeth 9 are non-rotatingly connected to the coupling housing 2 via the inner teeth 4.

The interior 11 of the coupling housing 2 accommodates the inner plates 6 and the outer plates 7 which are disposed in an alternating sequence. The plates 7 are held at predetermined spacings from one another while the plates 6 are axially movable. To achieve the spacing, each plate 7 has a predetermined number of its radially outer teeth 9 formed into spacing teeth 8.

The spacing teeth 8 are each bent out of the plane of the plate 7 to form a Z-shape. Between the inner plates 6 and the outer plates 7 there is a free space 12 in which the inner plates 6 are axially movable, whereas the outer plates 7 are spaced at a fixed distance from one another due to the teeth 8 bent so as to be Z-shaped. The orientation of adjacent plates 7 is different so that, at their bent ends, the Z-shaped teeth 8 cooperate with the non-deformed teeth 9 of the adjacent outer plate 7.

Figure 3:
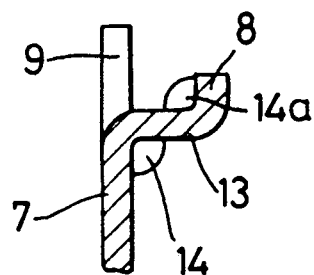
FIG. 3 is an enlarged detail of a Z-shaped spacing tooth of an outer plate of the fluid friction coupling shown in FIG. 2.

As can be seen in FIG. 3, the Z-shaped teeth 8 are bent by a right angle 14 out of the plane of the respective outer plate 7. After forming an axial web 13 of a predetermined length which depends on the required spacing, the respective tooth 8 bent so as to be Z-shaped is again bent by a second right angle 14a in a direction parallel to the plane of the outer plate. In consequence, the axial web 13 extends at a right angle relative to the plate of the respective outer plate 7 and when ensuring the distance relative to the adjacent outer plate (not illustrated) it does not have to accommodate any bending moments.

Figure 4:
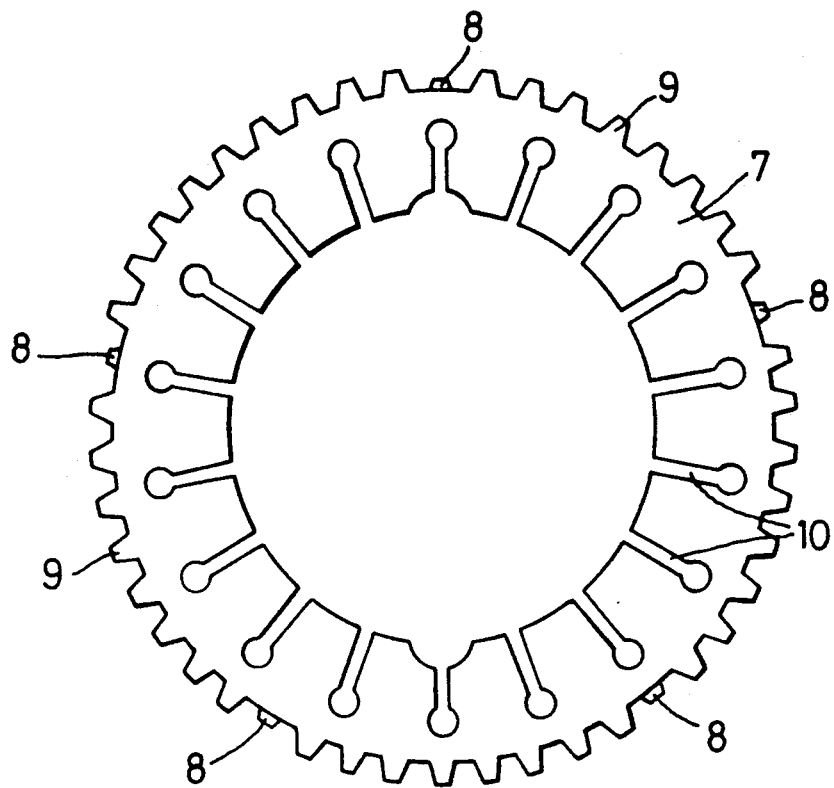
FIG. 4 is a plan view of an outer plate of the fluid friction coupling shown in FIG. 2.

The embodiment illustrated in FIG. 4 is provided with five teeth 8 bent so as to be Z-shaped. However, the number of Z-shaped teeth depends on the division of the outer teeth, but there should be at least 3 teeth of each plate bent so as to be Z-shaped. The illustrated outer plate 7 is provided with slot-shaped perforations 10. When fitting the outer plates 7, the Z-shaped teeth 8 are intended, in each case, to rest against a tooth 9 of the next adjacent outer plate. This objective can be achieved by providing index markings (not illustrated) on the plates and by making suitable provisions at the automatic feeding device.

Figure 5:
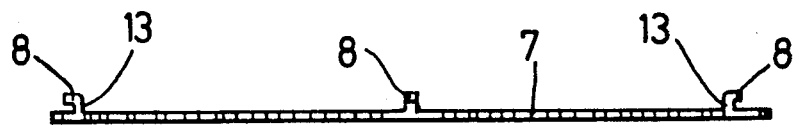
FIG. 5 is a side view of the outer plate shown in FIG. 4.

As shown in FIG. 5, the axial webs 13 resulting from the bent teeth 8 permit a kind of spacing which has a sufficiently high degree of dimensional accuracy. A fluid friction coupling provided with outer plates 7 spaced in this way may be associated for example with the central differential 22 of a motor vehicle such as it is illustrated in the drive concept of FIG. 1. In the case of the embodiment shown, the coupling hub 1 is the driving part, whereas the coupling housing 2 is the driven part connected to the rear axle differential via the propeller shaft 23. The interior of the coupling housing 2 is at least partially filled with a viscous medium, preferably a silicone oil.

Figure 6:
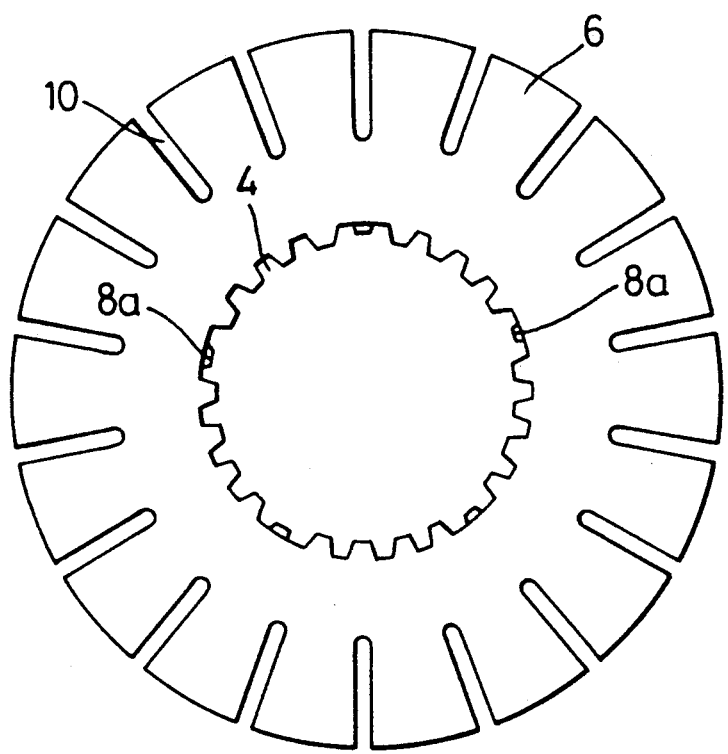
FIG. 6 is a plan view of an inner plate of a further embodiment of the invention, which has spacing teeth.

FIG. 6 shows an arrangement of Z-shaped spacing teeth 8a on an inner plate 6 of an alternative fluid friction coupling.

Figure 7:
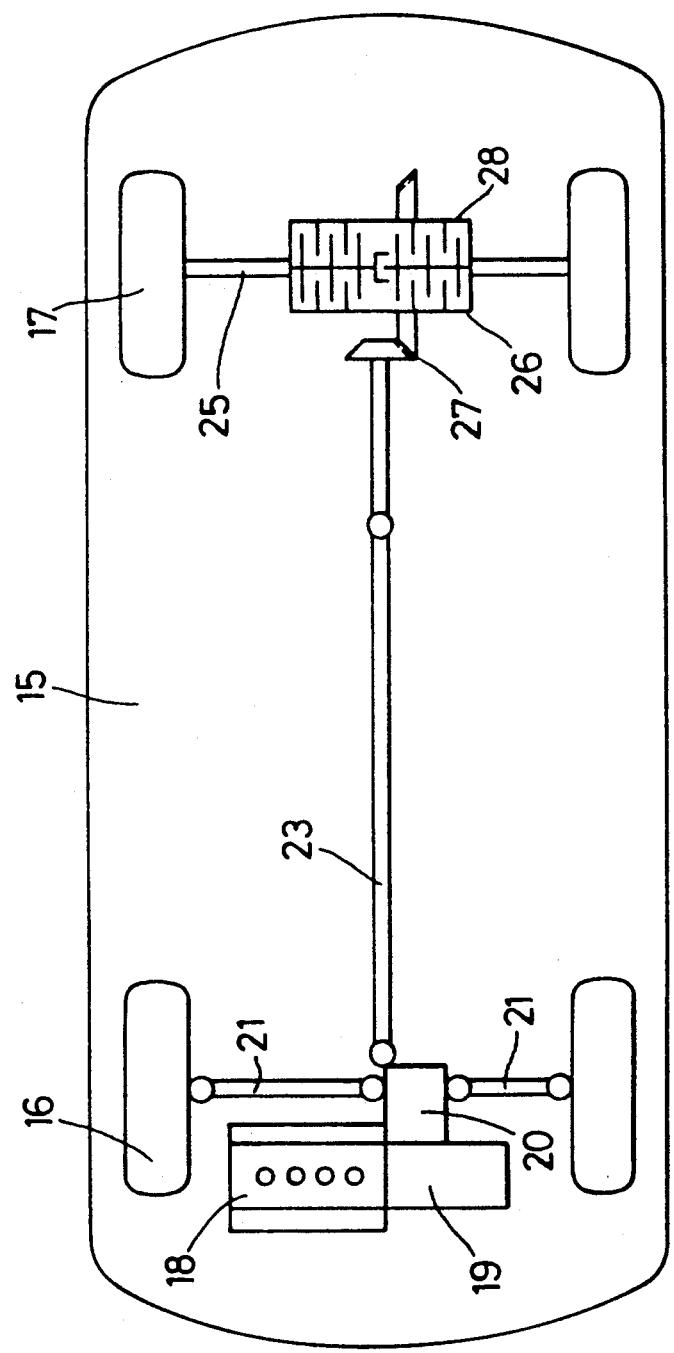
FIG. 7 is a diagram illustrating a second drive concept of a four wheel drive motor vehicle with a torque splitter incorporated into the rear axle.

FIG. 7 illustrates the basic concept of a vehicle drive where the central differential 22 is replaced by a torque splitter 28. This torque splitter 28 replaces the central differential 22 and at the same time the usual rear axle differential (24). The torque splitter consists of the housing 26 which is driven by the angular drive 27 and to which a set of outer plates is non-rotatingly connected, and of two sets of inner plates each of which is associated with a wheel drive. The invention may be used to great advantage here because this application requires a large number of plates so that automation has favourable effects.

We claim:

1. A fluid friction coupling having at least one coupling hub, and a coupling housing rotatably supported on the coupling hub, comprising:
   a first set of plates non-rotatably connected to the coupling hub; and
   a second set of plates non-rotatably connected to the coupling housing, the plates of each of the sets of plates being disposed in an alternating sequence with the plates of one of the first and second sets being held at predetermined axial spacing from one another while the plates of the other of the first and second sets are axially movable, wherein the plates of the one set have spacing means including a predetermined number of spacing teeth each of which is bent out of the plane of the plate to form a Z-shape having a portion of said Z-shaped teeth substantially normal to the plane of the plate and two bending angles which are both 90 degrees so as to maintain constant axial spacing between the plates when axial force is applied to said spacing teeth.

2. A fluid friction coupling according to claim 1, wherein the one set of plates having the spacing teeth is the second set of plates non-rotatably connected to the coupling housing.

3. A fluid friction coupling according to claim 1, wherein the one set of plates having the spacing teeth is the first set of plates non-rotatably connected to the coupling hub.

* * * * *